(12) United States Patent
Dhara et al.

(10) Patent No.: US 12,346,864 B2
(45) Date of Patent: Jul. 1, 2025

(54) MULTI-DIMENSIONAL MODELING OF FUEL AND ENVIRONMENT CHARACTERISTICS

(71) Applicant: MOTIVE TECHNOLOGIES, INC., San Francisco, CA (US)

(72) Inventors: Raghu Dhara, Fremont, CA (US); Varun, Pune (IN)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 219 days.

(21) Appl. No.: 17/529,360

(22) Filed: Nov. 18, 2021

(65) Prior Publication Data

US 2023/0153735 A1    May 18, 2023

(51) Int. Cl.
*G06Q 10/0639* (2023.01)
*G01C 21/34* (2006.01)
*G06N 20/00* (2019.01)
*G07C 5/08* (2006.01)

(52) U.S. Cl.
CPC ... *G06Q 10/06393* (2013.01); *G01C 21/3469* (2013.01); *G06N 20/00* (2019.01); *G07C 5/0808* (2013.01)

(58) Field of Classification Search
CPC .......... G06Q 10/06393; G06N 20/00; G01C 21/3469; G07C 5/0808
USPC ....................................................... 705/7.39
See application file for complete search history.

(56) References Cited

U.S. PATENT DOCUMENTS

| | | | |
|---|---|---|---|
| 6,086,511 A * | 7/2000 | Droge | B60K 26/00 477/121 |
| 11,803,556 B1 * | 10/2023 | Samdani | G06F 16/24578 |
| 11,932,242 B1 * | 3/2024 | Crego | B60W 30/09 |
| 2014/0046701 A1 * | 2/2014 | Steinberg | B60W 40/10 705/4 |
| 2020/0023811 A1 * | 1/2020 | Herman | B60R 25/01 |
| 2020/0055525 A1 * | 2/2020 | Zeng | B60W 40/09 |
| 2020/0072137 A1 * | 3/2020 | Cai | F02D 25/02 |
| 2021/0012263 A1 * | 1/2021 | Li | G06Q 10/06393 |
| 2021/0247777 A1 * | 8/2021 | Jornod | G08G 1/22 |

FOREIGN PATENT DOCUMENTS

| | | | | |
|---|---|---|---|---|
| DE | 102010017485 A1 * | 5/2011 | | B60W 30/143 |
| JP | 2012250628 A * | 12/2012 | | |
| JP | 2022178622 A * | 12/2022 | | B60W 40/13 |

\* cited by examiner

*Primary Examiner* — Abdallah A El-Hage Hassan
(74) *Attorney, Agent, or Firm* — George David Zalepa; Greenberg Traurig, LLP (57) ABSTRACT

The disclosed embodiments provide techniques for generating a fuel score for a driver or vehicle. In one embodiment, a method is disclosed comprising generating a deviation vector based on recorded vehicle metrics for a given user, wherein the deviation vector comprises differences between recorded non-fuel metrics and expected non-fuel metrics; predicting, using a statistical learning (e.g., linear regression) model, deviation in fuel consumption amount using the deviation vector of non-fuel metrics; and computing a fuel score for the given user based on the deviation in fuel consumption and a current fuel score.

20 Claims, 7 Drawing Sheets

| Segment | Direction | RPM |
|---|---|---|
| A | SOUTH | 1200 |
| B | SOUTH | 1250 |
| C | EAST | 1300 |
| C | WEST | 1400 |
| D | EAST | 1300 |
| D | WEST | 1400 |
| E | NORTH | 1400 |
| F | NORTH | 1200 |

| Segment | Direction | RPM |
|---|---|---|
| A | SOUTH | 1300 |
| B | SOUTH | 1350 |
| C | EAST | 1400 |
| C | WEST | 1500 |
| D | EAST | 1300 |
| D | WEST | 1500 |
| E | NORTH | 1500 |
| F | NORTH | 1300 |

Table 500 (columns: 502 Driver, 504 Segment, 506 Direction, 508 RPM, 510 E_RPM):

| Driver | Segment | Direction | RPM | E_RPM |
|---|---|---|---|---|
| 1 | A | South | 1180 | 1200 |
| 1 | C | East | 1350 | 1300 |
| 1 | D | East | 1350 | 1300 |
| 1 | E | North | 1350 | 1400 |
| 2 | F | North | 1350 | 1300 |
| 2 | D | West | 1450 | 1500 |
| 2 | C | West | 1450 | 1500 |
| 2 | B | South | 1300 | 1350 |

Table (columns: 402A Segment, 404A Direction, 406A RPM):

| Segment | Direction | RPM |
|---|---|---|
| A | SOUTH | 1200 |
| C | EAST | 1300 |
| D | EAST | 1300 |
| E | NORTH | 1400 |

Table (columns: 402B Segment, 404B Direction, 406B RPM):

| Segment | Direction | RPM |
|---|---|---|
| F | NORTH | 1300 |
| D | WEST | 1500 |
| C | WEST | 1500 |
| B | SOUTH | 1350 |

FIG. 6

Table 600 (columns: 602 Driver, 604 Segment, 606 Direction, 608 RPM (V), 610 E_RPM (E(V)), 612 V-E(V)):

| Driver | Segment | Direction | RPM (V) | E_RPM (E(V)) | V-E(V) |
|---|---|---|---|---|---|
| 1 | A | South | 1180 | 1200 | -20 |
| 1 | C | East | 1350 | 1300 | 50 |
| 1 | D | East | 1350 | 1300 | 50 |
| 1 | E | North | 1350 | 1400 | -50 |
| 2 | F | North | 1350 | 1300 | 50 |
| 2 | D | West | 1450 | 1500 | -50 |
| 2 | C | West | 1450 | 1500 | -50 |
| 2 | B | South | 1300 | 1350 | 0 |

Table 618 (columns: 614 Driver, 616 $\sum(V-E[V])$):

| Driver | $\sum(V-E[V])$ |
|---|---|
| 1 | 30 |
| 2 | -50 |

MULTI-DIMENSIONAL MODELING OF FUEL AND ENVIRONMENT CHARACTERISTICS

BACKGROUND

The disclosed embodiments are directed toward modeling the activities of automobiles and drivers and, in particular, toward developing a comprehensive representation of the fuel consumption of a vehicle and driver for segments of roadways.

Current systems that attempt to rate fuel consumption are based on rudimentary data collection and processing. Such systems primarily gather data regarding driving behavior (e.g., engine speed over time, coasting, idling time, speeding time, etc.), aggregate such data, and generate a score. Such systems fail to account for the context in which these raw events occur. For example, if all drivers exhibit a high aggregate engine speed value on a given segment of a road (e.g., due to roadway geometry), a driver that likewise operates a vehicle at a similar engine speed should not be penalized harshly due simply to a high engine speed. Currently, no such scores can account for these contextual factors.

BRIEF SUMMARY

The disclosed embodiments solve these and other problems by providing a fine-grained fuel efficiency score. The example embodiments provide a framework for obtaining an in-depth understanding of the impact of driver behavior and vehicle performance on fuel consumption. Further embodiments provide actionable insights to reduce fuel expenditure. The example embodiments allow fleet operators to identify top and bottom performing drivers from a fuel consumption perspective that excludes non-driver factors such as vehicle, environment, etc. Further, individual drivers can be benchmarked against a global network of drivers across different fleets. The described fuel scores can be used to identify which drivers need to be coached and on what behaviors they should be coached.

In sum, the fuel score generated by the example embodiments takes a variety of features into account and ultimately produces an integer score. In some embodiments, the larger the number, the better the driver is deemed to be. In some embodiments, the disclosed scores can be used by downstream applications such as fleet scoring, fleet benchmarking, vehicle scoring, vehicle return on investment calculations, and artificial intelligence-based coaching engines.

In an embodiment, a method is disclosed comprising generating a deviation vector based on recorded vehicle metrics for a given user, wherein the deviation vector comprises differences between recorded non-fuel metrics and expected non-fuel metrics. The method then includes predicting, using a statistical learning (e.g., linear regression) model, deviation in fuel consumption using the deviation vector of non-fuel metrics. Finally, the method includes a methodology for computing a fuel score for the given user based on the expected fuel consumption and a current fuel score.

In an embodiment, the non-fuel metrics can include one or more of engine speed, vehicle speed, hard acceleration intensity, hard acceleration frequency, hard acceleration duration, hard braking intensity, hard braking frequency, hard braking duration, cargo load status, engine load, torque output, and fuel quantity.

In an embodiment, generating a deviation vector can include computing deviations of the given user for a plurality of road segments, each road segment associated with a subset of the non-fuel metrics. In an embodiment, each dimension of the deviation vector can be associated with a respective non-fuel metric and wherein each dimension comprises a summation of deviations of the respective non-fuel metric. In an embodiment, the statistical learning model can include a plurality of coefficients, the plurality of coefficients associated with non-fuel deviations. In an embodiment, computing a fuel score further can include computing a sigmoid of the coefficients and the deviation vector, an output of the sigmoid comprising a driver update value. In an embodiment, computing a fuel score further can include applying a learning update using at least the driver update value, the current fuel score, and a learning rate.

In various further embodiments, the disclosure provides devices, systems, and non-transitory computer-readable storage media for implementing or executing the aforementioned method embodiments.

DETAILED DESCRIPTION

Figure 1:
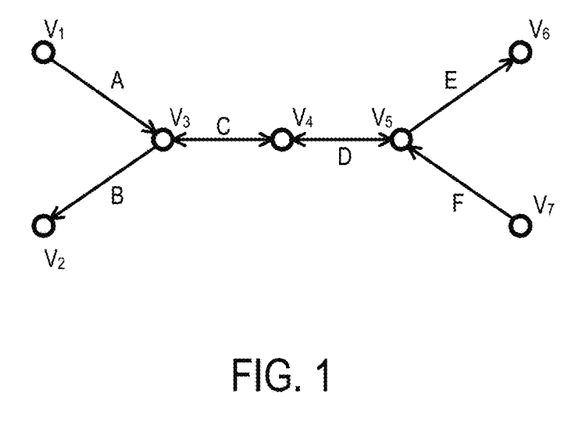
FIG. 1 is a diagram of a road network according to some embodiments of the disclosure.

FIG. 1 is a diagram of a road network according to some embodiments of the disclosure.

In the illustrated embodiment, a roadway includes a plurality of segments (A-F). Each segment is associated with two vertices (e.g., $v_1$ through $v_7$). Thus, any roadway can be constructed as a graph. As illustrated, in some embodiments, this graph is directed. Alternatively, in other embodiments, the graph may be undirected. In these embodiments, the direction of segments (A-F) may correspond to a flow of traffic along the roadway. Thus, for example, traffic can flow from $v_1$ to $v_3$, but not vice versa. Similarly, traffic can flow in both direction between $v_3$ and $v_4$. In some embodiments, each segment may represent multiple lanes. For example, segments C and D may comprise a multi-lane highway segment including two eastbound lanes and two westbound lanes. In an undirected graph, a single line segment can be used to represent this segment. In general, the choice of a graph type may be determined based on the needs of the implementation, and the disclosed embodiments are not limited to a specific graph type or topology.

In some embodiments, the vertices ($v_1$ through $v_7$) may correspond to physical junctions. For example, vertex ($v_3$) may comprise a T-junction between roadways corresponding to segment A, segment B, and segment C. In other embodiments, the vertices ($v_1$ through $v_7$) may correspond to larger geographic landmarks such as cities or towns. However, the disclosed embodiments are not limited in this manner. For example, the vertices ($v_1$ through $v_7$) may comprise arbitrary points along a roadway. For example, vertex ($v_4$) may comprise an arbitrary point along a single stretch of highway comprising segments C and D. For example, each roadway may be segmented into one- or two-mile segments. Thus, a given vertex may comprise a "mile marker" vertex that is not bound to a specific location or roadway feature. In this manner, roadways can be represented more granularly (i.e., by increasing the number of vertices and, by proxy, the number of segments) or less granularly (i.e., by decreasing the number of vertices and segments). As a non-limiting example, each segment may comprise short sections (e.g., 50 feet) of a roadway. The decision regarding which granularity to use can be determined based on the underlying processing and storage capacity of the system storing the road data as well as the effects of the granularity on overall model performance.

FIGS. 2 through 6 utilize the graph in FIG. 1 as an example roadway subject to modeling using the general techniques discussed in connection with FIG. 7. The examples provided below in FIGS. 2 through 6 are not limiting but are merely examples of the types of operations described in more detail FIG. 7.

Figure 2:
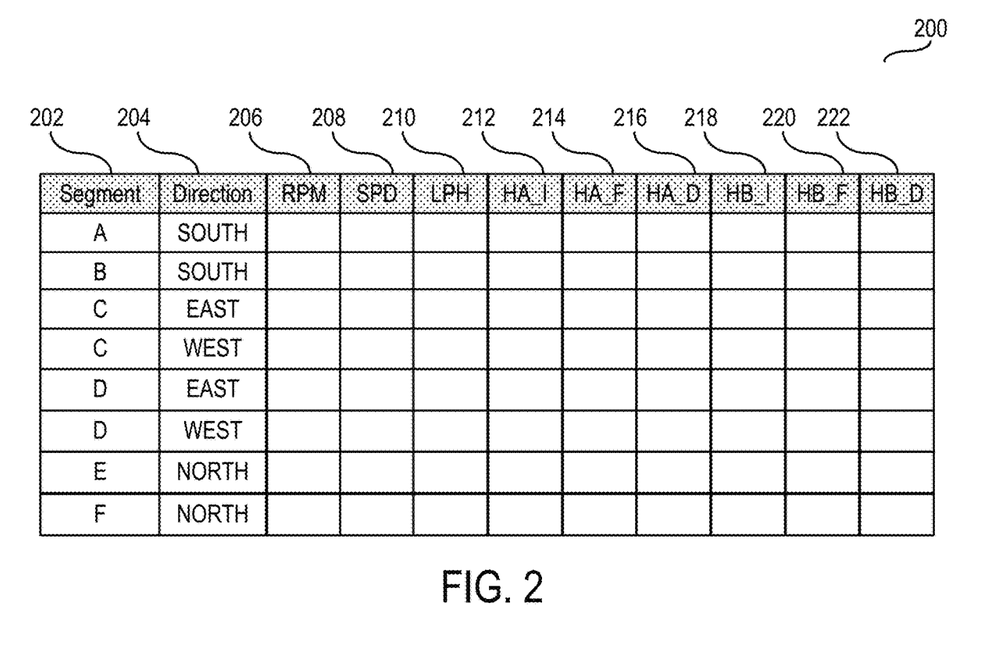
FIG. 2 is a database diagram of expected roadway data according to some embodiments of the disclosure.

FIG. 2 is a database diagram of expected roadway data according to some embodiments of the disclosure.

In the illustrated embodiment, the roadway modeled in FIG. 1 is represented in a relational database form, as depicted in FIG. 2. In the illustrated embodiment, a table 200 includes a plurality of columns and a plurality of rows.

Specifically, the columns include a segment column 202. In the illustrated embodiment, the segment column 202 stores the segment identifiers depicted, for example, in FIG. 1. Although alphabetical identifiers are used, any unique value may be used to identify a segment of the roadway. Since the roadway of FIG. 1 includes six segments (A-F), the table 200 includes rows corresponding to each segment. Certainly, a production system would include significantly more rows than depicted and the embodiments are not limited to a specific number of rows.

The columns additionally include a direction column 204. In the illustrated embodiment, the direction column 204 represents a geographic direction associated with a given roadway. For one-way roads, such as those represented by segments A, B, E, and F, each segment is represented once with a single direction. However, for two-way roads (e.g., segments C and D), multiple records exist for each segment, the multiple records corresponding to the different directions of travel on the segment. Although only one- and two-way roads are illustrated, the disclosure does not place a theoretical limit on the number of directions associated with a roadway. Further, the disclosure places no limitation on how directions are represented (e.g., using compass directions) and other mechanisms (e.g., vector representations) can be used. In general, any technique to distinguish different directions of travel on a single segment may be used.

The columns include an engine speed column 206, also referred to as a revolutions per minute (RPM) column, a speed column 208, and a fuel column 210. In the illustrated embodiment, the engine speed column 206, speed column 208, and fuel column 210 each contain baselines (updated with a potentially variable periodicity) for aggregate engine speed, vehicle (ground) speed, and fuel consumption, respectively, on a given roadway segment.

In the illustrated embodiment, engine speed column 206 can be represented in revolutions per minute or similar formats. In the illustrated embodiment, speed column 208 can be represented as a floating-point speed aggregate. In the illustrated embodiment, fuel column 210 can be represented in a unit of fuel per distance. For example, fuel column 210 can be represented in units of liters per 100 kilometers.

The columns additionally include a HA_I column 212 that stores data representing the intensity of hard accelerations for a given segment. As used herein, a hard acceleration refers to an acceleration event with a telematic signature which is determined algorithmically to be an abnormally high positive longitudinal acceleration. In some embodiments, the value in the HA_I column 212 is measured in g-forces. In some embodiments, this value is measured by onboard electronics installed in a vehicle. In one embodiment, the onboard electronics may comprise built-in measurement systems (e.g., connected to a controller area network bus of the vehicle or built-in to a vehicle subsystem). In other embodiments, the electronics may comprise an after-market device for recording vehicle data. In some embodiments, an accelerometer may be used to measure hard accelerations in, for example, meters per second squared. Such electronics may continuously report the acceleration of the vehicle during operation and thus during driving on each of the segments (A-F). In some embodiments, when the onboard electronics detect a hard acceleration, they transmit a notification of this event to a centralized system maintaining the table 200. In one embodiment, the HA_I column 212 stores an aggregate measure (such as but not limited to the average value) of the hard acceleration intensity, which may also be considered, and in some instances referred to as, the expected value of hard acceleration intensity for that segment, and thus updates this per-segment aggregate value using the received values.

The table 200 additionally includes an HA_F column 214 that stores the frequency of hard acceleration events on a given segment of roadway. In some embodiments, a centralized system will monitor the number of hard acceleration events vehicles produce while operating on the road network and will accumulate the number of hard accelerations detected. The system will then update (with a potentially defined periodicity) the baseline for the frequency of hard accelerations for the segment.

The table 200 additionally includes an HA_D column 216 that stores the duration of hard acceleration events on a given segment of roadway. In the illustrated embodiment, the duration may be stored as an aggregate measure of the number of seconds that a hard acceleration event lasts on a roadway. As discussed above, the vehicle may report both the start and stop of a hard acceleration event to the centralized system. These events may include timestamps that the centralized system can use to compute the duration of a hard acceleration event. As with the HA_F column 214, the system accumulates hard acceleration events as drivers traverse various road segments over a period of time. Then, with a potentially variable periodicity, these accumulated values will be used to update the overall baseline for the computed aggregate duration of a hard acceleration for a given segment.

The table further includes an HB_I column 218, an HB_F column 220, and an HB_D column 222 storing hard braking intensity, frequency, and duration, respectively. Details of these columns are similar to that of the HA_I column 212, HA_F column 214, and HA_D column 216. Indeed, a hard braking intensity is also measured in meters per second squared (and subsequently may be converted to gs), and hard braking duration is also measured in seconds. However, while hard acceleration is an increase in velocity, hard braking is a decrease in velocity. Otherwise, the same techniques may be applied to monitoring hard braking as are applied to hard accelerations.

Various other data points can be included, but are not depicted. For example, the table 200 can include columns for the "load status" (e.g., how laden the vehicle is) of a vehicle (e.g., cargo load status, engine load, torque output, and fuel quantity). As another example, metrics such as power take-off, vehicle idling, fuel type, diagnostic fault codes, can also be used as raw metrics recorded by an in-vehicle device.

As discussed, the values stored in the rows and columns may be updated as vehicles travel on the roadways. Thus, the values may be constantly and frequently changing (according to a potentially variable periodicity). In some embodiments, incoming data is buffered in a raw data store before processing and updating the table 200. In one embodiment, the data in the table 200 may be updated in real-time, while in other embodiments, the data in the table 200 may be updated in a batch process (e.g., according to the variable periodicity).

In the illustrated embodiment, the table 200 may further include more or fewer columns than those illustrated. Indeed, the table 200 may include any numeric value representing an event on a roadway. Such values may further include derived values.

As one example, a vehicle may be equipped with an outward facing camera that can be used to monitor weather conditions for each segment and various derived metadata, such as the frequency of precipitation, the presence of fog, or aggregate temperature readings, may be recorded and stored for each segment. Other examples of such environmental data include, but are not limited to, road surface conditions (e.g., ice, water, etc.), traffic conditions (e.g., traffic volume, etc.), and visibility (e.g., visibility distance, etc.). Such information gathered from the dashcam models and environmental data can be stored and aggregated in different ways (e.g., by calculating the likelihood, frequency, or conditioning of the events).

In the illustrated embodiment, table 200 can be associated with a specific make, model, and year of vehicle. In some embodiments, table 200 can be associated with one of a specific make, model, or year. A make, model, and year (or permutations thereof) is referred to as a vehicle class. Thus, in operation, table 200 can be replicated for each known vehicle class. Thus, while FIG. 2 illustrates a single table, a system in operation may store many such tables for each vehicle class.

In some embodiments, the tables can be assigned based on properties of the vehicles. For example, passenger vehicles may record data in a table separate from commercial trucks. In an alternative embodiment, a table can exist for each category of vehicles defined in a standardized stratification of vehicles (e.g., eight classes as defined by weight by the U.S. Department of Transportation Federal Highway Administration).

In one embodiment, the table 200 is only populated with data when sufficient telematics data is received. Thus, in some embodiments, a road segment will only be added to the table when the number of recorded measurements is above a triggering threshold. In some embodiments, if a given road segment does not have enough data, data from adjacent segments (referred to as 1-degree neighbor segments) may be used to populate data for the segment. Returning to FIG. 1, if segment C does not have enough data to reach the trigger threshold, the data from one or more segments (A, B, and D) can be used as data for segment C. In some embodiments, this operation is recursive. That is, a centralized system will continue to expand its search (e.g., to 2-degree neighbor segments, 3-degree neighbor segments, etc.) until enough data is identified to meet the triggering threshold. Other algorithmic means of populating data for these sparse segments can also be used.

Figure 3:
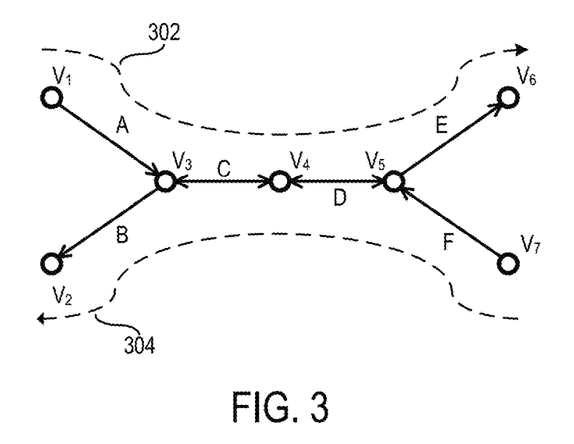
FIG. 3 is a diagram of a road network and driver paths according to some embodiments of the disclosure.

FIG. 3 is a diagram of a road network and driver paths according to some embodiments of the disclosure.

The illustrated roadway network includes the same segments (A-F) and vertices ($v_1$ through $v_7$) as that depicted in FIG. 1, and the disclosure regarding the roadway provided in FIG. 1 is not repeated herein.

As illustrated, two driver paths are illustrated, including a first driver path 302 and a second driver path 304. The first driver path 302 can be represented as a sequence of segments driven on by the first driver: A→C→D→E. Similarly, the second driver path 304 can be represented as the sequence F→D→C→B. Alternatively, the vertices ($v_1$ through $v_7$) can be used to represent the first driver path 302 and second driver path 304.

In general, the illustrated diagram shows two driver paths, wherein the first driver path 302 and second driver path 304 both indicate the respective drivers have traveled on segment C and segment D. Conversely, only the first driver path 302 includes segment A and segment E, and only the second driver path 304 includes segment B and segment F. In some embodiments, a vehicle associated with the first driver path 302 can be in a different class than that of a vehicle associated with the second driver path 304, as illustrated next in FIG. 4.

The disclosed embodiments are not limited to two paths and, as will be illustrated, any arbitrary number of paths can be recorded and used. Indeed, the greater the number of paths, the more data captured, and the more accurate modeling can be.

Figure 4:
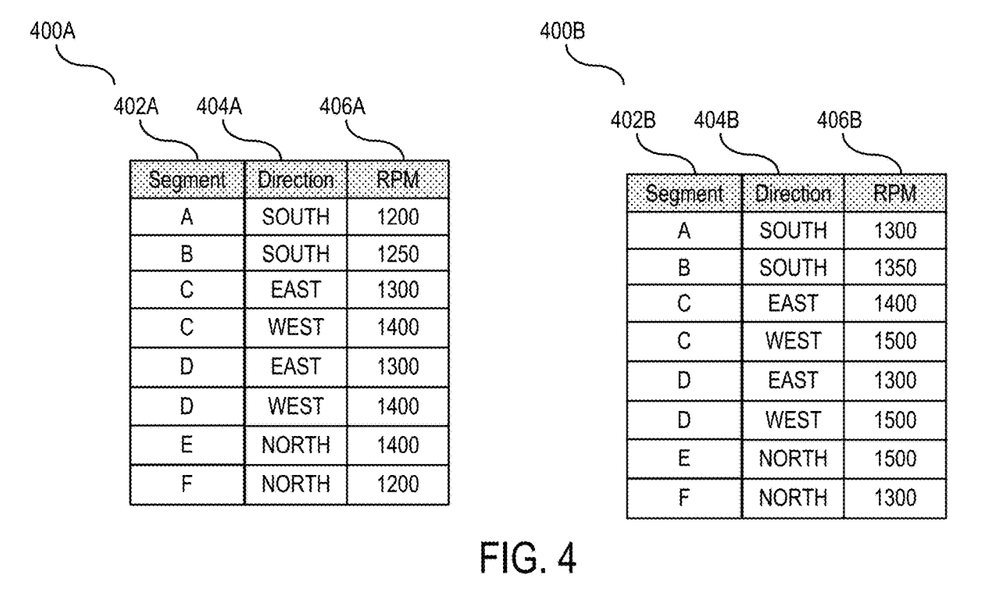
FIG. 4 is a database diagram of two columns of an expected roadway data table for two driver paths according to some embodiments of the disclosure.
Figure 5:
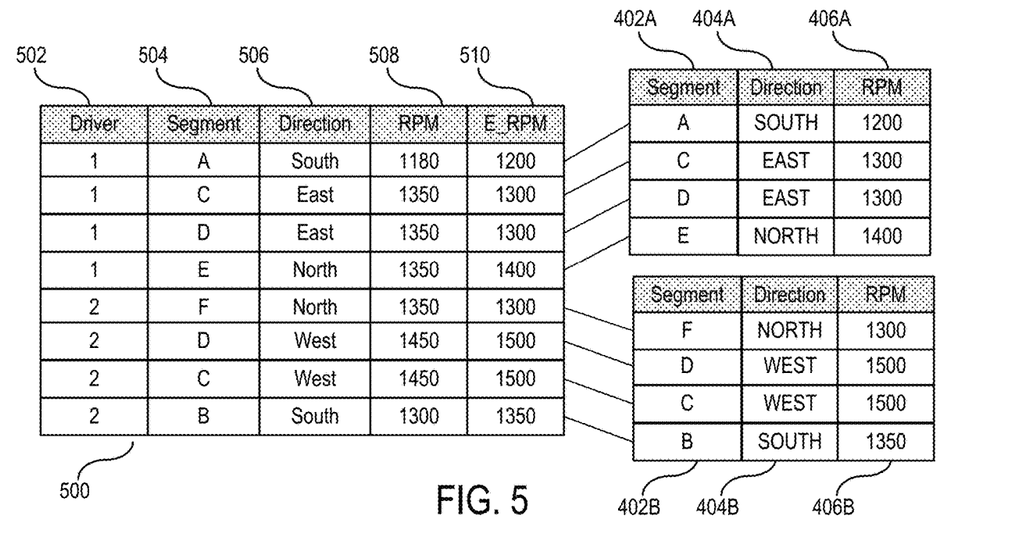
FIG. 5 is a database diagram of two driver paths and a view of a roadway data table according to some embodiments of the disclosure.
Figure 6:
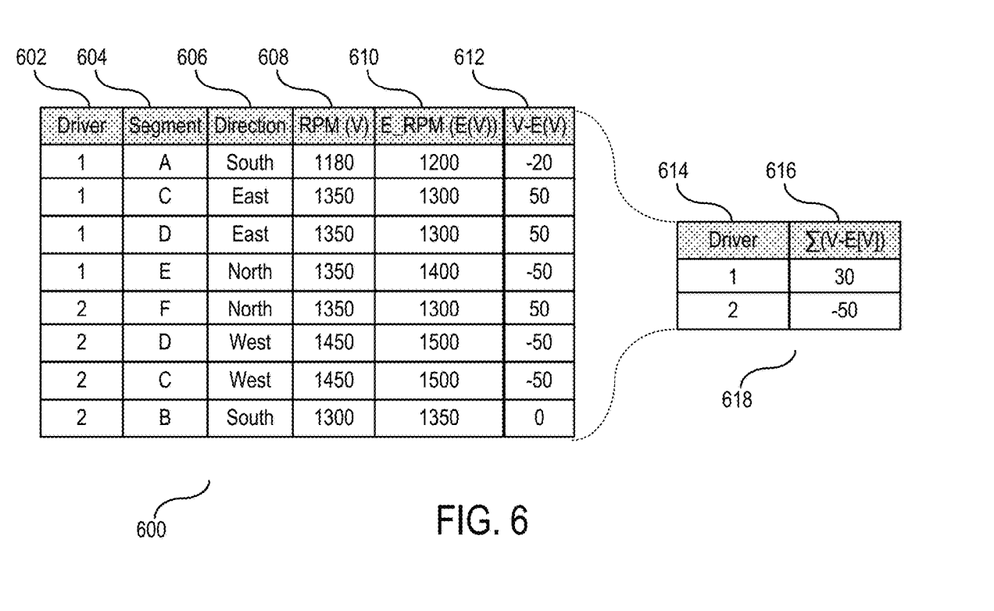
FIG. 6 is a database diagram of two driver paths along with expected roadway data and aggregated deviations according to some embodiments of the disclosure.

The following FIGS. 4 through 6 illustrate the use of the first driver path 302 and second driver path 304 and data collected thereon to update a table 200 of roadway data. The following FIGS. 4 through 6 utilize the engine speed column 206 of the table 200 illustrated in FIG. 2 as an example. However, the same techniques can be applied to any other type of column, as discussed.

FIG. 4 is a database diagram of two columns of an expected roadway data table for two drivers' paths according to some embodiments of the disclosure.

In the illustrated embodiment, a first view 400A of a table, such as a table 200, is depicted as including three columns: a segment column 402A, a direction column 404A, and an engine speed column 406A representing the average engine speed recorded along a segment. The view 400A can comprise a partial view of a larger table, such as a table 200. Indeed, segment column 402A can correspond to segment column 202 of FIG. 2, direction column 404A can comprise direction column 204 of FIG. 2, and engine speed column 406A can comprise engine speed column 206 of FIG. 2.

As illustrated, a second view 400B of a table is depicted as including three columns: a segment column 402B, a direction column 404B, and an engine speed column 406B representing the average engine speed recorded along a segment. In the illustrated embodiment, the first view 400A can be associated with a first class of vehicle (e.g., a 2020 Freightliner® Cascadia®) while the second view 400B can be associated a second class of vehicle (e.g., a 2015 Freightliner® Cascadia®). As discussed, the disclosure is not limited to only two classes.

As discussed in connection with FIG. 3, as drivers travel on the roadway, engine speed events (and others) are transmitted to a centralized system. Based on, for example, a global positioning system (GPS) and a vehicle or driver identifier, the centralized system can store a list of such events associated with both drivers and segments (A-F).

For example, a first driver (ID=1) traveling along segment A may transmit the following engine speed events:

A, SOUTH, 1609528495,1,1240
A, SOUTH, 1609528555,1,1210
A, EAST, 1609528615,1,1200
A, EAST, 1609528675,1,1050

Here, the first value (A) represents the segment, the second value (e.g., SOUTH) represents the direction of travel, the third value (e.g., 1609528495) represents a timestamp (e.g., in Unix epoch time), the fourth value (1) represents a driver identifier, and the final value (e.g., 1240) represents the recorded engine speed (in revolutions per minute). The centralized system can compute the average of all recorded data for segment A (e.g., 1200) and store this value in the engine speed column 406A for segment A for the pertinent directions.

Certainly, many segments will have data from multiple drivers. For example, for segment (C), the centralized system may receive the following data:

C, WEST, 1609528495,2,1300
C, WEST, 1609528555,2,1280
C, WEST, 1609615075,1,1320

As discussed, the format of this data can include the segment, direction, timestamp, driver identifier, and engine speed value. The centralized system can then average the values and store this average (1300) as the value for the engine speed column 406A of segment C. Certainly, the above data points may not be received simultaneously, and so the aggregate baseline values may be updated in a batch manner with a potentially variable periodicity including in real-time. Further, although averages are used, these calculations are exemplary and other aggregation techniques can be used to calculate the values. Further, the foregoing techniques can be applied for each class and thus, as one example, separate updates can trigger similar updates to engine speed column 406B of second view 400B.

In the illustrated embodiment, each column of the table 200 (and thus views such as first view 400A or second view 400B) is continuously updated (either in a batch mode, or in real or near real-time) in this manner based on received data. In some embodiments, the table 200 can be continuously updated during a preconfigured window length (e.g., 30 days). After the window length expires, the historical data may be recorded for historical analysis. In some embodiments, the table 200 may then be truncated or erased and reset for further accumulation. In other embodiments, the table may simply be continuously updated and refined without truncating data. Ultimately, the data in the table 200 may be considered an expected value for a corresponding column and row.

Thus, returning to FIG. 4, the expected engine speeds, in revolutions per minute, are continuously updated and stored for each segment-direction permutation. These expected values can then be used to compute deviations for individual drivers, as discussed next in connection with FIG. 5.

FIG. 5 is a database diagram of two driver paths and a view of a roadway data table according to some embodiments of the disclosure.

In the illustrated embodiment, a table 500 is depicted. This table 500 includes fields (such as segment column 504 and direction column 506) described with respect to view 400 described in FIG. 4, and the description of the view 400 is not repeated herein. For example, the values stored in segment column 504, direction column 506, and expected engine speed column 510 have been described previously with respect to segment column 402A, direction column 404A, and engine speed column 406A, respectively, and the details of the contents of those fields are not repeated at length. However, it should be noted that the contents of table 500 correspond to per-user recorded data (individual data points or aggregates) whereas the contents of first view 400A and second view 400B comprise expected values computed across all drivers (on a per-class basis).

In the illustrated embodiment, a table 500 stores data associated with driver activity. In the illustrated embodiment, the table 500 stores data associated with the first driver path 302 (represented by rows having a driver identifier column 502 of "1") and the second driver path 304 (represented by rows having a driver identifier column 502 of "2") depicted in FIG. 3. As discussed, the first driver path 302 includes segments A→C→D→E while the second driver path 304 includes segments F→D→C→B. Thus, these eight segments are stored as eight rows in the table 500. Although illustrated as rows in, for example, a relational table, the disclosure is not limited to such an implementation and other storage mechanisms (plaintext, NoSQL, log-based, etc.) may be used.

In the illustrated embodiment, the table 500 includes a driver identifier column 502 that identifies each driver or vehicle that has reported data for a segment. The table 500 additionally includes a segment column 504 that identifies a road segment that the driver or vehicle has driven on. In some embodiments, these fields may uniquely identify a given data point reported by a driver or vehicle. In some embodiments, the table 500 may further include a timestamp column (not illustrated) that further uniquely identifies the reported data. In some embodiments, this timestamp may comprise a time window as the remaining data is aggregated over a period of time. In some embodiments, the table 500 may be ephemeral and thus only store driver data for a short period of time (e.g., immediately after exiting a segment and for only as much time needed to process the data). The table 500 can further include a direction column 506 that represents the direction of travel on the corresponding segment in segment column 504. Thus, in some embodiments, the driver identifier column 502, segment column 504, and direction column 506 are sufficient to uniquely identify a segment of a driver's path.

In the illustrated embodiment, driver identifier column 502, segment column 504, direction column 506, and recorded engine speed column 508 can be populated based on per-driver metrics recorded (either individually or aggregated over a period of time). By contrast, expected engine speed column 510 can be retrieved from a database of expected values, such as those depicted in FIG. 4 (and included in FIG. 5).

As one example, the table 500 includes an expected engine speed column 510, which represents the average engine speed (in rpm) for a given segment. In the illustrated embodiment, the values in the expected engine speed column 510 may be extracted from the roadway data, such as in first view 400A and second view 400B. In one embodiment, the expected values may be copied into the table 500 to enable a log of what the expected value was at the time of recording (since the expected value will change over time). Thus, the table 500 can be persisted for later processing while roadway data, including data in first view 400A and second view 400B, can be continuously updated. The engine speed values are thusly collected and can be aggregated with a potentially variable periodicity to produce the baselines (i.e., expected values) table.

Although only engine speed data is illustrated, the above process may be repeated for all measurable metrics. In one embodiment, the table 500 can be expanded to include additional column pairs for recorded and expected data. In another embodiment, separate tables may be used for each column pair (e.g., a second table for hard acceleration intensity, a third table for hard acceleration frequency, etc.).

FIG. 6 is a database diagram of two driver paths along with expected roadway data and aggregated deviations according to some embodiments of the disclosure.

In the illustrated embodiment, the driver identifier column 602, segment column 604, and direction column 606, correspond to the driver identifier column 502, segment column 504, and direction column 506 in FIG. 5, and those details are not repeated herein.

In the illustrated embodiment, the table 600 includes a value column 608 and an expected value column 610. In one embodiment, the data in the value column 608 and expected value column 610 correspond to the values populating the recorded engine speed column 508 and expected engine speed column 510 of FIG. 5, and those details are not repeated herein. However, as indicated, the table 600 may be generalized for any measurable metric and is not limited to engine speed measurements (or aggregates), thus the use of "value" and "expected value" in lieu of "engine speed" and "expected engine speed".

In the illustrated embodiment, the table 600 further includes a deviation column 612. In the illustrated embodiment, the deviation column 612 is populated by calculating the difference between the value column 608 data and the expected value column 610 data. Thus, for the first row (driver 1, segment A), the deviation is computed by subtracting 1200 from 1080, yielding 20.

Thus, for each driver and each driven segment, the table 600 stores a deviation from an expected value for each type of measurement. From this per-segment data, a per-driver score for the relevant metric can be calculated.

Specifically, as illustrated in the table 618, each driver can be associated with a second driver identifier column 614. In the illustrated embodiment, the second driver identifier column 614 is processed such that, for a given metric, each driver identifier is associated with a single row.

Further, as illustrated, each driver identified in the second driver identifier column 614 is associated with a component column 616 value. In the illustrated embodiment, the component column 616 is populated by aggregating all deviations stored in the deviation column 612 for a given driver. Thus, as illustrated, the component column 616 for driver 1 is computed by summing the values in the deviation column 612 for the first four rows (−20+50+50−50=30).

Thus, in the illustrated embodiments, raw data associated with drivers is continuously received, processed, and summarized in a per-metric component. While the foregoing examples in FIGS. 1 through 6 use engine speed as an example, the above example may be extended to various other parameters. A generalized description of the above method is provided next in combination with FIGS. 7A and 7B.

Figure 7A:
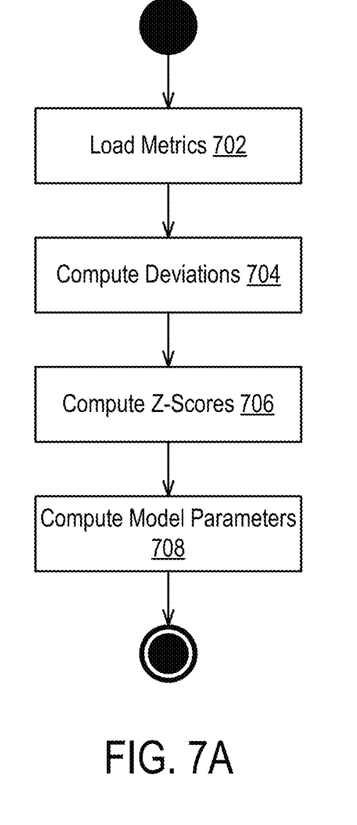
FIG. 7A is a flow diagram illustrating a method for training a statistical learning model according to some embodiments of the disclosure.

FIG. 7A is a flow diagram illustrating a method for training a linear regression model according to some embodiments of the disclosure. Various terms and concepts that have been described with respect to the preceding figures are not repeated in detail herein, and reference is made to those figures for further detail of such terms and concepts.

In the illustrated embodiment, the method may be executed by a centralized system such as a cloud computing platform or server. In some embodiments, the method is executed at regular intervals (e.g., every day, every 30 days, etc.).

In step 702, the method can include loading recorded metrics.

In some embodiments, the recorded metrics can comprise raw telematics data (e.g., engine speed, vehicle speed, fuel usage, hard acceleration, and braking data, etc.) as described in, for example, the description of FIG. 2. In some embodiments, the recorded metrics can comprise per-class recorded metrics across all members of the class and thus represent a global data set per-class. In some embodiments, the raw telematics data can include data such as engine speed (in rpm), vehicle speed (in mph), hard braking and accelerations intensities, frequencies, and durations, as well as other non-fuel related parameters.

In an embodiment, the raw telematics data is captured for a given period and is represented as a vector V of measured values. As discussed in the previous figures, the method in step 702 can also load corresponding expected values for these parameters. The correspond expected values can be represented as a vector E[V], where V and E[V] have the same dimensionality.

In addition to raw telematics data represented as vector V, the method can load both a fuel consumption amount (in, for example, liters per 100 kilometers or miles per gallon) represented as a scalar value LPH as well as an expected fuel consumption amount represented as a scalar value E[LPH].

In some embodiments, the method receives the above raw telematics data from computing devices installed onboard vehicles. In some embodiments, these computing devices may comprise integrated computing devices (i.e., devices installed by the manufacturer of the vehicle) or after-market computing devices. In some embodiments, the vehicles comprise a fleet of non-autonomous vehicles. In other embodiments, the vehicles may comprise a fleet of autonomous vehicles. In some embodiments, both autonomous and non-autonomous vehicles may be mixed in a fleet.

As discussed, expected data can be retrieved from a stored data set. In some embodiments, the method loads the expected data from a data warehouse, data lake, or another high-capacity storage system. In general, the storage medium may store the expected data with no or minimal processing to ensure that as much data is recorded as possible.

In step 704, the method can include computing a deviation vector. In one embodiment, the method can include computing a deviation of the non-fuel consumption data (V). In an embodiment, the deviation vector can be represented as $V_{dev}=V-E[V]$.

In step 706, the method can include computing z-scores for the deviation vector, fuel consumption amount, and expected fuel consumption amount.

In one embodiment, the method calculates z-scores for each measurement metric. Thus, the method will calculate z-scores for each deviation in V, as well as z-scores for deviation in fuel consumption (LPH). In one embodiment, a z-score ($z_m$) for a metric (m) is calculated according to:

$$z_m = \frac{X_m - \overline{X}_m}{S_m} \quad \text{(Equation 1)}$$

where $X_m$ represents the raw metric score for metric m, $\overline{X}_m$ represents the mean of all measurements for metric m, and $S_m$ represents the standard deviation of all measurements for metric m. In some embodiments, the window of data considered in the row set used to compute the sample mean and variance is potentially variable.

In the illustrated embodiment, the method can calculate a z-score of the deviation of fuel consumption. This deviation can be represented as $z_{DEVLPH}=z_{LPH-E(LPH)}$. In some embodiments, the value of $z_{DEVLPH}$ can represent the predicted output of a linear regression model.

Thus, at the conclusion of step 706, the method can generate a vector having the form:

$$V_{in}=[z_{DEVLPH}, z_1, z_2 \ldots z_n] \quad \text{(Equation 2)}$$

where $z_{DEVLPH}$ represents the label (i.e., predicted output) and $z_1, z_2 \ldots z_n$ represent the z-scores for raw telemetrics deviations computed over $V_{dev}$ (i.e., the explanatory variables).

The foregoing steps can be performed globally, for all users and for all road segments to generate a data set of vectors, each having a form of $V_{in}$.

In step 708, the method computes model parameters using the generated vector space. In an embodiment, the model parameters can comprise coefficients of a linear model computed using a linear regression technique. In an embodiment, the linear model can be represented as:

$$z_{DEVLPH}=a_1 z_1 + a_2 z_2 + \ldots + a_n z_n \quad \text{(Equation 3)}$$

Here, in step 708, the method performs a linear regression to obtain the coefficients $a_1 \ldots a_n=W$, which explain the contributions of non-fuel consumption deviations to a fuel consumption deviation.

Figure 7B:
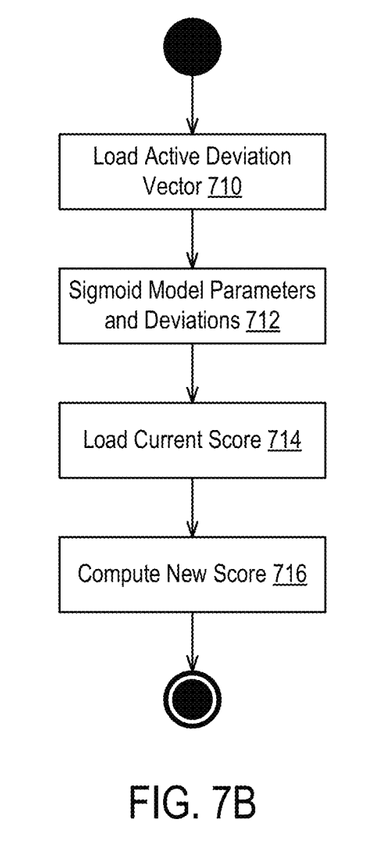
FIG. 7B is a flow diagram illustrating a method for continuously updating a fuel score according to some embodiments of the disclosure.

FIG. 7B is a flow diagram illustrating a method for continuously updating a fuel score according to some embodiments of the disclosure. Various terms and concepts that have been described with respect to the preceding figures are not repeated in detail herein, and reference is made to those figures for further detail of such terms and concepts.

In step 710, the method can include loading an active deviation vector. In an embodiment, an active deviation vector refers to a vector associated with a driver or vehicle that includes deviation values across a plurality of recorded telemetry data categories. For example, in some embodiments, the method of FIG. 7B can be executed at regular intervals for each driver or vehicle and a deviation vector can be computed for such a driver or vehicle based on the expected aggregate data and the recorded aggregate data for the specific user, as described in FIG. 6. While FIG. 7B and FIG. 7A are illustrated separately, they can be run simultaneously such that at a given time the expected aggregate values are computed, and each user's recorded values are aggregated for each road segment and direction. In such an embodiment, a system can update the model parameters using the method of FIG. 7A while preparing per-user vectors using step 708.

In some embodiments, the active deviation vector can include raw telematics data such as engine speed (in rpm), vehicle speed (in mph), hard braking and accelerations intensities, frequencies, and durations, as well as other non-fuel related parameters. In the following examples, the active deviation vector is represented as:

$$V_{active}=[v_1-E[v_1], v_2-E[v_2] \ldots v_n-E[v_n]] \quad \text{(Equation 4)}$$

where $v_i$ represents a measured metric for a driver and segment and $E[v_i]$ represents the expected value of the corresponding metric.

In some embodiments, step 710 can further include computing a fuel consumption deviation value for a given driver/segment. In an embodiment, the fuel consumption deviation value can be computed as $lph_{dev}=lph-E[lph]$, where lph represents the measured fuel consumption for a given driver and segment and $E[lph]$ represents the expected fuel consumption for a given driver and segment. In some embodiments, the method can further comprise computing z-scores for each dimension of $V_{active}$ and for $lph_{dev}$.

In step 712, the method can include applying a sigmoid operation to the model parameters generated in step 708, the active deviation vector ($V_{active}$) computed in step 710, and the fuel consumption deviation ($lph_{dev}$).

In one embodiment, step 710 can comprise computing the dot product of the active deviation vector $V_{active}$ and the model parameters W as described with respect to Equations 3 and 4. In some embodiments, the active deviation vector $V_{active}$ can be concatenated with $lph_{dev}$ before computing the dot product.

In some embodiments, the method may further apply a sigmoid squashing function to the result. In general, the sigmoid squashing function may comprise any sigmoid function that ensures that the dot product output falls within a predefined range (e.g., 0 to 1). Thus, the fuel score update value ($X_T$) can be represented as follows:

$$\begin{aligned} X_T &= \sigma(V_{active} \cdot W) \quad \text{(Equation 5)} \\ &= \sigma\left(\begin{bmatrix} v_1 - E[v_1] \\ v_2 - E[v_2] \\ \ldots \\ v_n - E[v_n] \end{bmatrix} \cdot \begin{bmatrix} a_1 \\ a_2 \\ \ldots \\ a_n \end{bmatrix}\right) \\ &= \sigma\left(\sum_{i=1}^{n} a_i(v_i - E[v_i])\right) \end{aligned}$$

where $\sigma$ represents a sigmoid squashing function.

In step 714, the method can include loading a current fuel score for a driver or vehicle. In an embodiment, the current fuel score can be loaded from a database of current driver or vehicle scores. Specifically, the method can use a driver or vehicle identifier of a driver or vehicle used to load the fuel data in step 710 and query such a database to load the current fuel score of the driver or vehicle.

In step 716, the method computes a new fuel score using the fuel score update value from Equation 5 and the driver's current fuel score. In one embodiment, the method calculates the new fuel score by bounding the new score, providing edge resistance, and facilitating score surprise. In some embodiments, score surprise can be defined as a feature of the score wherein updates that deviate from our expectation result in more drastic score changes. For example, an equivalently positive update should increase the score of a driver with a lower score more than it would increase the score of a driver with a higher score since a driver with a higher score is expected to receive a positive update. These features are described in more detail here and may be represented via the following equation:

$$S_t = \begin{cases} S_{t-1} + \lfloor \eta \cdot (100 - S_{t-1}) \cdot (0.5 - \sigma(X_T)) \rfloor, & X_T \leq 0 \\ S_{t-1} - \lfloor \eta \cdot S_{t-1} \cdot (\sigma(X_T) - 0.5) \rfloor, & X_T > 0 \end{cases} \quad \text{(Equation 6)}$$

where $S_t$ represents the new fuel score, $S_{t-1}$ represents a current stored fuel score, $\eta$ represents a tunable learning rate, and $X_T$ represents the fuel score update value computed using, for example, Equation 5 and where $\sigma$ represents a sigmoid squashing function. Note that the value of 100 used above in Equation 6 is the maximum score in this exemplary case but the maximum value can be any positive real number.

As illustrated in Equation 6, the new fuel score ($S_t$) is a function of the previous fuel score $S_{t-1}$. When $X_T$ is less than or equal to zero, it is considered a positive update as the driver has performed better in aggregate across the input dimensions than expected. In this case the previous fuel score $S_{t-1}$ is incremented by a calculated amount. This calculated amount is the product of the learning rate ($\eta$), which is tunable, an edge resistance ($100-S_{t-1}$) and a bounding parameter $0.5-\sigma(X_T)$. In Equation 6, the learning rate comprises a tunable constant. In some embodiments, the learning rate is greater than zero but less than or equal to one. The edge resistance comprises a value between a minimum (e.g., 0) and maximum (e.g., 100). As illustrated, the edge resistance during a positive update reduces the magnitude of the update value as the previous score approaches the maximum (e.g., 100). This limits the impact of the increment as the previous score approaches this maximum value and consequently makes it increasingly difficult to reach this value.

Conversely, the bounding parameter makes it increasingly difficult to reach a score value of zero. Again, in some embodiments, zero is the minimum value in this exemplary embodiment—any real value less than the aforementioned maximum value can be employed. Specifically, when $X_T \leq 0$ the sigmoid output of $X_T$ will be less than 0.5 but greater than 0. Thus, the bounding parameter will be between 0 (for a typical deviation vector) and 0.5 (for an exceptional deviation vector).

When $X_T > 0$, the update is considered a negative score update as the driver has performed more poorly in aggregate across the input dimensions than expected. In this scenario, an edge resistance of $S_{t-1}$ is applied. Since this edge resistance is proportional to the previous score, it reduces the negative impact of a poor fuel score update on a lower score and thus does not overly penalize drivers with already low scores. Similarly, a bounding parameter of $\sigma(X_T)-0.5$ is applied. Since the value of $X_T$ is greater than zero, the value of $\sigma(X_T)$ will be greater than 0.5 but less than one. In this manner, the effect of the fuel score update is dampened in the opposite direction of the previous bounding parameter.

The foregoing example in Equation 6 is exemplary only and is not unduly limiting. Other score update techniques may be used to increment a previous score based on a vector of measurements. Further, the techniques for performing edge resistance and bounding are exemplary only, and other techniques may be used.

Figure 8:
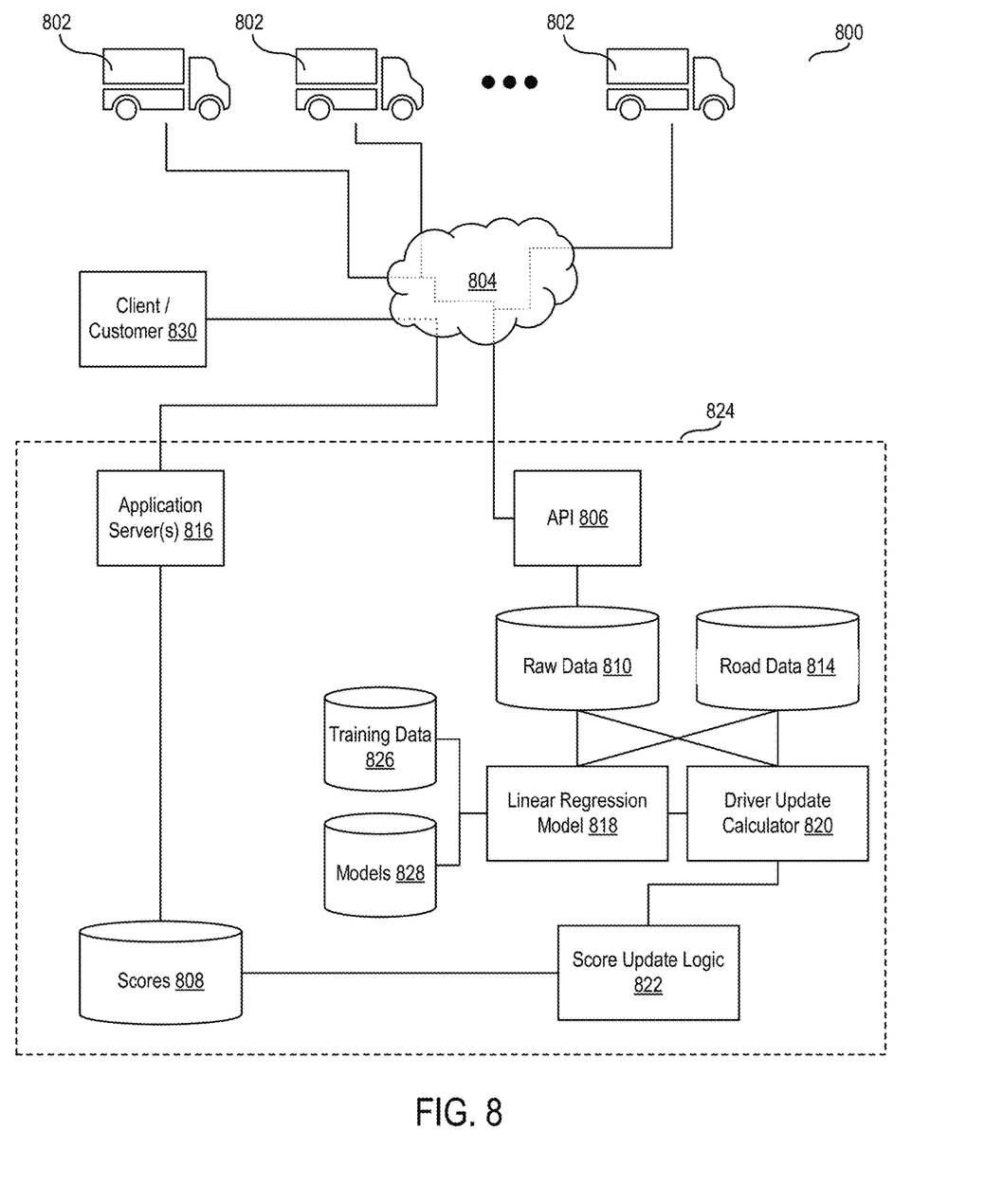
FIG. 8 is a block diagram of a system 800 for computing a fuel score according to some embodiments of the disclosure.

FIG. 8 is a block diagram of a system 800 for computing a fuel score according to some embodiments of the disclosure.

In the illustrated embodiment, a plurality of vehicles 802 is communicatively coupled to a centralized system 824 via a network 804 such as the Internet. In one embodiment, each of the vehicles 802 includes a wireless transceiver for transmitting and receiving data over the network 804. For example, each of the vehicles 802 may include a cellular transceiver for transmitting and receiving data. In the illustrated embodiment, the vehicles 802 may be equipped with computing devices for monitoring vehicular performance. In some embodiments, these computing devices may be embedded in the vehicle or may comprise after-market additions. In general, such devices record telematics data of the vehicles, as discussed above, and in some embodiments other data such as video, images, weather reports, etc. In the illustrated embodiment, the vehicles 802 transmit data gathered by the computing devices to the centralized system 824 via the network 804. In one embodiment, the vehicles 802 stream this data to the centralized system 824. In other embodiments, the vehicles 802 periodically transmit data in batches to the centralized system 824.

The centralized system 824 includes an application programming interface or API 806. In the illustrated embodiment, the API 806 receives all data from the vehicles 802 and may comprise a load balancing server or similar device/software. In the illustrated embodiment, the API 806 writes the received data to a raw data store 810. The API 806 may perform any other functions such as user authentication, timestamping, duplicate removal, etc., which are not critical to understanding the disclosed embodiments.

In one embodiment, the raw data store 810 may comprise a big data storage platform such as a distributed database or file system. In some embodiments, the API 806 writes data directly to the raw data store 810. In other embodiments, the raw data store 810 may pre-process or clean the raw data prior to persisting. In some embodiments, the raw data store 810 comprises a data lake that stores arbitrary files (text, image, video, etc.). In other embodiments, the raw data store 810 may comprise a variegated data store wherein data types are routed to appropriate underlying sub-storage devices. For example, textual data may be stored in a log-structured or relational database, while image and video may be written to a distributed file system. The specifics of the underlying storage mechanism of the raw data store 810 are not limiting.

In the illustrated embodiment, a fuel score update logic 822 runs continuously to update fuel scores stored in the fuel score database 808. In the illustrated embodiment, the fuel score database 808 comprises a set of driver or vehicle identifiers mapped to fuel scores and, in some embodiments, to companies or organizations. The fuel score update logic 822 executes periodically (e.g., every day, week, month, etc.) and updates fuel scores or some or all of the driver/vehicle identifiers in the fuel score database 808.

In the illustrated embodiment, the fuel score database 808 utilizes a linear regression model 818 and driver update calculator 820 to generate a new score for a given driver. In the illustrated embodiment, the linear regression model 818 receives input from training data 826, models 828, raw data store 810, and road data store 814. In one embodiment, the models 828 include current model parameters and, in some embodiments, historic model parameters. Models 828 may additionally include learning rates and other tunable parameters used by the linear regression model 818 and fuel score update logic 822.

In one embodiment, training data 826 comprises deviation and fuel consumption data, as described in more detail in FIG. 7A. In the illustrated embodiment, the linear regression model 818 outputs model parameters (e.g., coefficients of a linear equation). In one embodiment, the dimensions of the model parameters are equal to the measurement vectors output by the driver update calculator 820, as will be discussed. In general, the model parameters describe the relative importance of non-fuel measurements based on actual fuel consumption data.

In the illustrated embodiment, the driver update calculator 820 receives raw data and road data and generates a deviation vector for a given driver. For example, the driver update calculator 820 may receive a set of raw metrics for a given set of road segments, may aggregate the data to form a measurement vector for each measurement type, and then may compute z-scores for the measurement vector. The driver update calculator 820 can perform further operations such as those described in step 712, which are not repeated in detail herein.

Various details of the linear regression model 818 and driver update calculator 820 have been described previously. Specifically, FIGS. 1 through 6 and steps 710 and 712 of FIG. 7B may be performed by the driver update calculator 820, and the method of FIG. 7A may be performed by the linear regression model 818. Those descriptions are not repeated herein but are incorporated in their entirety. Further, although the illustrated embodiment describes the use of a linear regression model, other models may be used, as previously discussed.

In the illustrated embodiment, the fuel score update logic 822 receives the output of driver update calculator 820. In some embodiments, the fuel score update logic 822 then applies a learning update rule to the result of the sigmoid operation performed by the driver update calculator 820 to obtain a new score. Finally, the fuel score updater 822 updates the fuel score database 808 with the new score for a given driver/vehicle. In some embodiments, the fuel score database 808 maintains a historical log of scores on a per-driver basis when the scores are updated, thus allowing audit tracking. Details of this process are described in more detail in the description of steps 714 and 716 of FIG. 7B, and that description is not repeated herein but is incorporated in its entirety.

In the illustrated embodiment, application servers 816 access the score database 808 to retrieve fuel scores for drivers or vehicles. In one embodiment, the application servers 816 provide end-user functionality to clients 830 based on the fuel scores in the fuel score database 808. Thus, in some embodiments, the application servers 816 may comprise a web server providing a web-based interface providing various functions. Alternatively, or in conjunction with the foregoing, the application servers 816 may comprise web APIs providing data to mobile applications. The disclosed embodiments are not limited to specific client-facing applications, however various examples of such client-facing applications are provided herein.

In one embodiment, the application servers 816 may provide an application (or data for an application) that allows managers and drivers alike to contextualize and act upon factors that affect their fuel consumption in a timely manner. To make the insights that the score provides easier to operationalize, the application servers 816 may implement artificial intelligence (AI) powered coaching workflows that take the fuel score as one of the primary inputs. In such a system, a client 830 may access the application servers 816 to set time-bound goals per driver or group of drivers associated with fuel scores in the fuel score database 808. These goals could either be target scores to attain or targets (e.g., Stretch Goal, Maintain Goal) that the centralized system 824 translates into fuel scores. In one embodiment, the application servers 816 suggest fuel scores based on fuel score history and other aspects of driving behavior. Next, the application servers 816 can generate concrete action plans (in terms of driver behavior) in order to achieve these goals using a combination of AI and fuel score dynamics. The application servers 816 will then display both these goals and the progress being made towards them along the dimensions suggested by the action plan. In conjunction with manual intervention by managers, the application servers 816 can recommend coaching material for drivers to review if progress towards goals is deemed insufficient. Incentive structures can be built into the application servers 816 that facilitate the disbursement of awards to drivers who meet safety goals within the time bound of the goal. The cycle then repeats.

In another embodiment, the application servers 816 may be used to calculate a vehicle return on investment (ROI). In some embodiments, the fuel scores can be used as part of a comprehensive ROI calculator that allows operators to evaluate the tradeoffs between maintaining older vehicles and switching to newer models.

Figure 9:
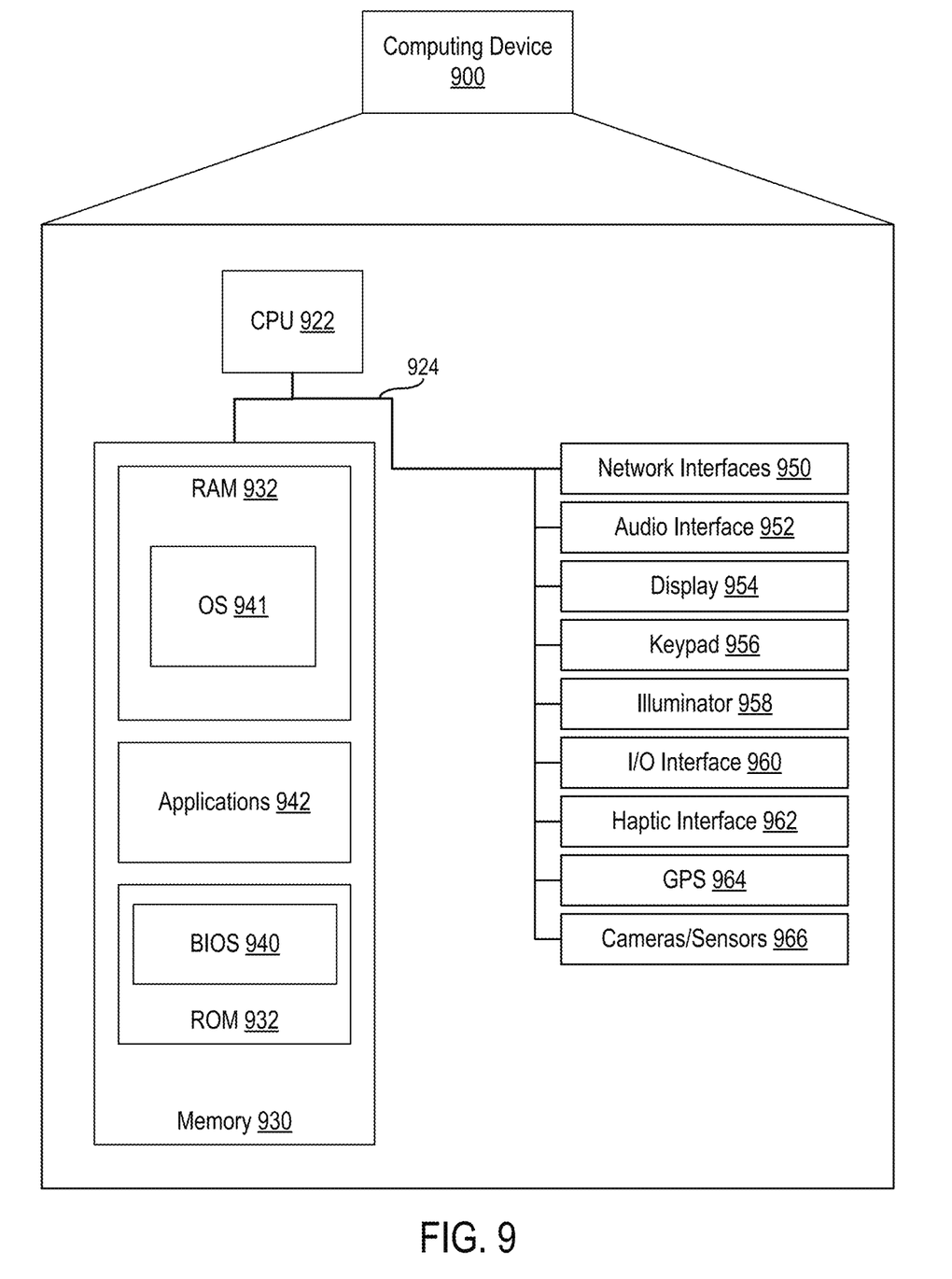
FIG. 9 is a block diagram illustrating a computing device showing an example of a client or server device used in the various embodiments of the disclosure.

FIG. 9 is a block diagram illustrating a computing device showing an example of a client or server device used in the various embodiments of the disclosure.

The computing device 900 may include more or fewer components than those shown in FIG. 9, depending on the deployment or usage of the device 900. For example, a server computing device, such as a rack-mounted server, may not include an audio interface 952, display 954, keypad 956, illuminator 958, haptic interface 962, global positioning system (GPS) receiver 964, or cameras/sensor 966. Some devices may include additional components not shown, such as graphics processing unit (GPU) devices, cryptographic co-processors, artificial intelligence (AI) accelerators, or other peripheral devices.

As shown in the figure, the device 900 includes a central processing unit (CPU) 922 in communication with a mass memory 930 via a bus 924. The computing device 900 also includes one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal, or electromagnetic sensors 966. Device 900 can include one camera/sensor 966 or a plurality of cameras/sensors 966. The positioning of the camera(s)/sensor(s) 966 on the device 900 can change per device 900 model, per device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In one embodiment, the bus 924 may comprise a Peripheral Component Interconnect Express (PCIe) bus. In some embodiments, the bus 924 may comprise multiple busses instead of a single bus.

Mass memory 930 illustrates another example of computer storage media for the storage of information such as computer-readable instructions, data structures, program modules, or other data. Mass memory 930 stores a basic input/output system ("BIOS"), such as BIOS 940, for controlling the low-level operation of the computing device 900. The mass memory also stores an operating system 941 for controlling the operation of the computing device 900

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them to RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises an input/output interface 960 for communicating with external devices, using communication technologies, such as USB, infrared, Bluetooth™, or the like. The haptic interface 962 provides tactile feedback to a user of the client device.

The optional GPS receiver 964 can determine the physical coordinates of the computing device 900 on the surface of the Earth, which typically outputs a location as latitude and longitude values. GPS receiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may communicate through other components, provide other information that may be employed to determine a physical location of the device, including, for example, a MAC address, IP address, or the like.

Figure 10:
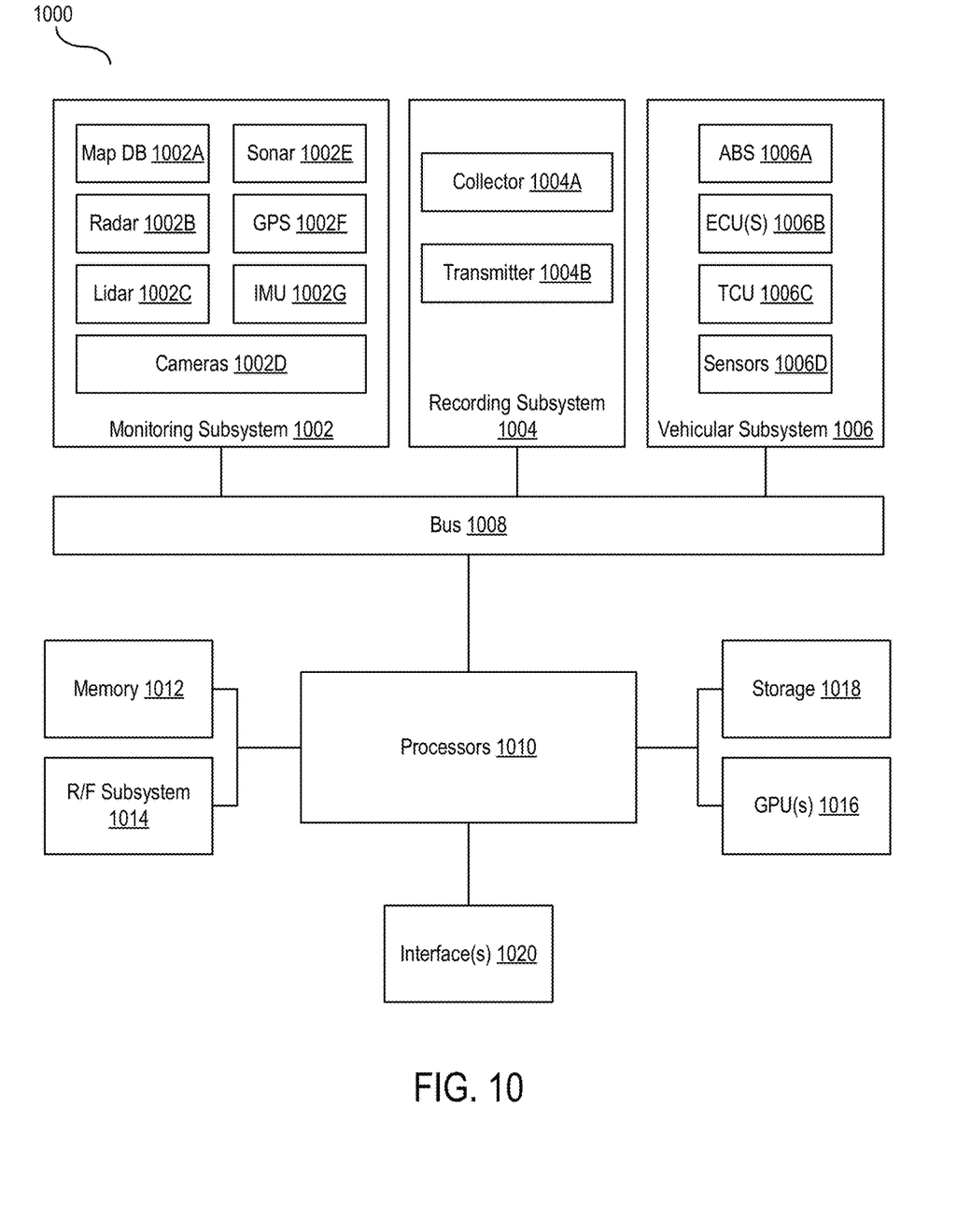
FIG. 10 is a block diagram of a vehicle according to some embodiments of the disclosure.

FIG. 10 is a block diagram of a vehicle according to some embodiments of the disclosure.

The system 1000 illustrated in FIG. 10 may be installed entirely within a vehicle. In some embodiments, some components (e.g., components and subsystems other than subsystem 1004) may comprise existing autonomous vehicle subsystems, although in some embodiments autonomous vehicle subsystems are optional. Thus, the vehicle in FIG. 10 may comprise either an autonomous, semi-autonomous or non-autonomous vehicle. Descriptions made herein are primarily described with respect to autonomous vehicles however this is not intended to be limiting.

In the illustrated embodiment, the system includes a monitoring subsystem 1002. In the illustrated embodiment, monitoring subsystem 1002 includes map database 1002A, radar devices 1002B, Lidar devices 1002C, digital cameras 1002D, sonar devices 1002E, global positioning system (GPS) receivers 1002F, and inertial measurement unit (IMU) devices 1002G. Each of the components of the monitoring subsystem 1002 comprise standard components provided in most current autonomous vehicles or ADAS. In one embodiment, map database 1002A stores a plurality of high-definition three-dimensional maps used for routing and navigation. Radar devices 1002B, Lidar devices 1002C, digital cameras 1002D, sonar devices 1002E, GPS receivers 1002F, and inertial measurement units 1002G may comprise various respective devices installed at various positions throughout the autonomous vehicle as known in the art. For example, these devices may be installed along the perimeter of an autonomous vehicle to provide location awareness, collision avoidance, and other standard autonomous vehicle or ADAS functionality. As discussed, in some embodiments, the monitoring subsystem 1002 may be optional or limited such as any form of an ADAS. For example, a non-autonomous vehicle may only include one camera device such as a dash-mounted camera device. In this embodiment, the camera may be included in the sensors 1006D.

Vehicular subsystem 1006 is additionally included within the system. Vehicular subsystem 1006 includes various anti-lock braking system (ABS) devices 1006A, engine control unit (ECU) devices 1006B, transmission control unit (TCU) devices 1006C, and various other sensors 1006D such as heat/humidity sensors, emissions sensors, etc. These components may be utilized to control the operation of the vehicle. In some embodiments, these components perform operations in response to the streaming data generated by the monitoring subsystem 1002. The standard autonomous vehicle interactions between monitoring subsystem 1002 and vehicular subsystem 1006 are generally known in the art and are not described in detail herein.

The processing side of the system includes one or more processors 1010, short-term memory 1012, a radio-frequency (RF) system 1014, graphics processing units (GPUs) 1016, long-term storage 1018 and one or more interfaces 1020.

One or more processors 1010 may comprise central processing units, field-programmable gate arrays (FPGAs, or any range of processing devices needed to support the operations of the autonomous vehicle. Memory 1012 comprises dynamic random-access memory (DRAM) or other suitable volatile memory for temporary storage of data required by processors 1010. RF system 1014 may comprise a cellular transceiver and/or satellite transceiver. Long-term storage 1018 may comprise one or more high-capacity solid-state drives (SSDs). In general, long-term storage 1018 may be utilized to store, for example, high-definition maps, routing data, and any other data requiring permanent or semi-permanent storage. GPUs 1016 may comprise one or more high throughput GPU/VPU/TPU devices for processing data received from monitoring subsystem 1002. Finally, interfaces 1020 may comprise various display units positioned within the autonomous vehicle (e.g., an in-dash screen).

Each of the devices is connected via a bus 1008. In one embodiment, the bus 1008 may comprise a controller area network (CAN) bus. In some embodiments, other bus types may be used (e.g., a FlexRay or Media Oriented Systems Transport, MOST, bus). Additionally, each subsystem may include one or more additional busses to handle internal subsystem communications (e.g., Local Interconnect Network, LIN, busses for lower bandwidth communications).

The system additionally includes a recording subsystem 1004 which performs the operations required by the methods illustrated in the preceding Figures. In the illustrated embodiment, the recording subsystem 1004 includes a collector 1004A that captures data recording by the monitoring subsystem 1002 and forwards relevant data to the transmitter 1004B which packages the data for transmission to a centralized system (e.g., 924).

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:
1. A method comprising:
recording, by a dashcam computing device installed within a vehicle and communicatively coupled to a telematics output of the vehicle, recorded vehicle metrics recorded during operation of the vehicle;
reading, by the dashcam computing device, geographic coordinates from a GPS transceiver of the vehicle associated with the recorded vehicle metrics while the vehicle is in motion;
establishing, by the dashcam computing device, a wireless connection to a remote system while the vehicle is in motion;
transmitting, by the dashcam computing device, the recorded vehicle metrics and the geographic coordinates to the remote system while the vehicle is in motion;
storing, by the remote system, the recorded vehicle metrics in a centralized vehicle metric database, the centralized vehicle metric database storing vehicle metrics for at least one other vehicle;

retrieving, by the remote system, other recorded vehicle metrics reported by other vehicles from the centralized vehicle metric database by querying the centralized vehicle metric database using one or more of a vehicle class and an identifier of a roadway segment associated with the geographic coordinates;

generating, by the remote system, a deviation vector based on the recorded vehicle metrics for a user and the roadway segment, wherein the deviation vector comprises differences between recorded non-fuel metrics and expected non-fuel metrics of other vehicles, the expected non-fuel metrics comprising aggregate values of other recorded vehicle metrics reported by the other vehicles;

predicting, by the remote system, a deviation in fuel consumption amount by inputting the deviation vector of non-fuel metrics into a statistical learning model, the statistical learning model predicting the deviation in fuel consumption amount;

computing, by the remote system using an adaptive scoring function, a fuel score for the user based on the deviation in fuel consumption and a historical fuel score wherein the adaptive scoring function includes edge resistance and score surprise factors to dynamically adjust a magnitude of score updates based on current score values;

transmitting, by the remote system, the fuel score to an end-user device in response to a network request for the fuel score issued by the end-user device to the remote system, the end-user device comprising a computing device external to the vehicle and the remote system;

displaying, by the end-user device, a visualization of the fuel score via one or more of a web-based interface or mobile application installed on the end-user device;

setting, by the remote system, a time-bound action plan for the user based on the fuel score and historical fuel score data;

tracking, by the remote system, a progress of the user towards the time-bound action plan based on a goal in the time-bound action plan; and displaying, by the remote system, a representation of the goal and the progress of the user via a user interface.

2. The method of claim 1, wherein the non-fuel metrics comprise one or more of engine speed, vehicle speed, hard acceleration intensity, hard acceleration frequency, hard acceleration duration, hard braking intensity, hard braking frequency, hard braking duration, cargo load status, engine load, torque output, and fuel quantity.

3. The method of claim 1, wherein generating a deviation vector comprises computing deviations of the user for a plurality of road segments, each road segment associated with a subset of the non-fuel metrics.

4. The method of claim 3, wherein each dimension of the deviation vector is associated with a respective non-fuel metric and wherein each dimension comprises a summation of deviations of the respective non-fuel metric.

5. The method of claim 1, wherein the statistical learning model comprises a plurality of coefficients, the plurality of coefficients associated with non-fuel deviations.

6. The method of claim 5, wherein computing a fuel score further comprises computing a sigmoid of the plurality of coefficients and the deviation vector, an output of the sigmoid comprising a driver update value.

7. The method of claim 6, wherein computing a fuel score further comprises applying a learning update using at least the driver update value, the historical fuel score, and a learning rate.

8. A non-transitory computer-readable storage medium for tangibly storing computer program instructions capable of being executed by a computer processor, the computer program instructions defining steps of:

recording, by a dashcam computing device installed within a vehicle and communicatively coupled to a telematics output of the vehicle, recorded vehicle metrics recorded during operation of the vehicle;

reading, by the dashcam computing device, geographic coordinates from a GPS transceiver of the vehicle associated with the recorded vehicle metrics while the vehicle is in motion;

establishing, by the dashcam computing device, a wireless connection to a remote system while the vehicle is in motion;

transmitting, by the dashcam computing device, the recorded vehicle metrics and the geographic coordinates to the remote system while the vehicle is in motion;

storing, by the remote system, the recorded vehicle metrics in a centralized vehicle metric database, the centralized vehicle metric database storing vehicle metrics for at least one other vehicle;

retrieving, by the remote system, other recorded vehicle metrics reported by other vehicles from the centralized vehicle metric database by querying the centralized vehicle metric database using one or more of a vehicle class and an identifier of a roadway segment associated with the geographic coordinates;

generating, by the remote system, a deviation vector based on the recorded vehicle metrics for a user and the roadway segment, wherein the deviation vector comprises differences between recorded non-fuel metrics and expected non-fuel metrics of other vehicles, the expected non-fuel metrics comprising aggregate values of other recorded vehicle metrics reported by the other vehicles;

predicting, by the remote system, a deviation in a fuel consumption amount by inputting the deviation vector of non-fuel metrics into a statistical learning model, the statistical learning model predicting the deviation in fuel consumption amount;

computing, by the remote system using an adaptive scoring function, a fuel score for a user based on the deviation in fuel consumption and a historical fuel score wherein the adaptive scoring function includes edge resistance and score surprise factors to dynamically adjust a magnitude of score updates based on current score values;

transmitting, by the remote system, the fuel score to an end-user device in response to a network request for the fuel score issued by the end-user device to the remote system, the end-user device comprising a computing device external to the vehicle and the remote system;

displaying, by the end-user device, a visualization of the fuel score via one or more of a web-based interface or mobile application installed on the end-user device;

setting, by the remote system, a time-bound action plan for the user based on the fuel score and historical fuel score data;

tracking, by the remote system, a progress of the user towards the time-bound action plan based on goal in the time-bound action plan; and displaying, by the remote system, a representation of the goal and the progress of the user via a user interface.

9. The non-transitory computer-readable storage medium of claim 8, wherein the non-fuel metrics comprise one or more of engine speed, vehicle speed, hard acceleration intensity, hard acceleration frequency, hard acceleration duration, hard braking intensity, hard braking frequency, hard braking duration, cargo load status, engine load, torque output, and fuel quantity.

10. The non-transitory computer-readable storage medium of claim 8, wherein generating a deviation vector comprises computing deviations of the user for a plurality of road segments, each road segment associated with a subset of the non-fuel metrics.

11. The non-transitory computer-readable storage medium of claim 10, wherein each dimension of the deviation vector is associated with a respective non-fuel metric and wherein each dimension comprises a summation of deviations of the respective non-fuel metric.

12. The non-transitory computer-readable storage medium of claim 8, wherein the statistical learning model comprises a plurality of coefficients, the plurality of coefficients associated with non-fuel deviations.

13. The non-transitory computer-readable storage medium of claim 12, wherein computing a fuel score further comprises computing a sigmoid of the plurality of coefficients and the deviation vector, an output of the sigmoid comprising a driver update value.

14. The non-transitory computer-readable storage medium of claim 13, wherein computing a fuel score further comprises applying a learning update using at least the driver update value, the historical fuel score, and a learning rate.

15. A system comprising:
a dashcam computing device installed within a vehicle of a user and communicatively coupled to a telematics output of the vehicle, the dashcam computing device configured to:
record recorded vehicle metrics recorded during operation of the vehicle,
read geographic coordinates from a GPS transceiver of the vehicle associated with the recorded vehicle metrics while the vehicle is in motion,
establish a wireless connection to a remote system while the vehicle is in motion;
transmit the recorded vehicle metrics and the geographic coordinates to a remote system while the vehicle is in motion;
the remote system configured to:
store the recorded vehicle metrics in a centralized vehicle metric database, the centralized vehicle metric database storing vehicle metrics for at least one other vehicle;
retrieve other recorded vehicle metrics reported by other vehicles from the centralized vehicle metric database by querying the centralized vehicle metric database using one or more of a vehicle class and an identifier of a roadway segment associated with the geographic coordinates;
generate a deviation vector based on the recorded vehicle metrics for the user and the roadway segment, wherein the deviation vector comprises differences between recorded non-fuel metrics and expected non-fuel metrics of other vehicles, the expected non-fuel metrics comprising aggregate values of other recorded vehicle metrics reported by the other vehicles,
predict a deviation in a fuel consumption amount by inputting the deviation vector of non-fuel metrics into a statistical learning model, the statistical learning model predicting the deviation in fuel consumption amount,
compute, using an adaptive scoring function, a fuel score for the user based on the deviation in fuel consumption and a historical fuel score, wherein the adaptive scoring function includes edge resistance and score surprise factors to dynamically adjust a magnitude of score updates based on current score values,
transmit the fuel score to an end-user device in response to a network request for the fuel score issued by the end-user device to the remote system, the end-user device comprising a computing device external to the vehicle and the remote system,
set a time-bound action plan for the user based on the fuel score and historical fuel score data,
track a progress of the user towards the time-bound action plan based on a goal in the time-bound action plan,; and
the end-user device configured to display a visualization of the fuel score and a representation of the goal and the progress of the user via one or more of a web-based interface or mobile application installed on the end-user device.

16. The system of claim 15, wherein the non-fuel metrics comprise one or more of engine speed, vehicle speed, hard acceleration intensity, hard acceleration frequency, hard acceleration duration, hard braking intensity, hard braking frequency, hard braking duration, cargo load status, engine load, torque output, and fuel quantity.

17. The system of claim 15, wherein generating a deviation vector comprises computing deviations of the user for a plurality of road segments, each road segment associated with a subset of the non-fuel metrics.

18. The system of claim 17, wherein each dimension of the deviation vector is associated with a respective non-fuel metric and wherein each dimension comprises a summation of deviations of the respective non-fuel metric.

19. The system of claim 15, wherein the statistical learning model comprises a plurality of coefficients, the plurality of coefficients associated with non-fuel deviations.

20. The system of claim 19, wherein computing a fuel score further comprises:
computing a sigmoid of the plurality of coefficients and the deviation vector, an output of the sigmoid comprising a driver update value; and
applying a learning update using at least the driver update value, the historical fuel score, and a learning rate.

* * * * *